(12) United States Patent
Savard

(10) Patent No.: US 11,794,835 B2
(45) Date of Patent: Oct. 24, 2023

(54) ANTI-THEFT DEVICE FOR BICYCLES BY BRAKING AT LEAST ONE WHEEL

(71) Applicant: Franck Jean Savard, Saint Martin de Re (FR)

(72) Inventor: Franck Jean Savard, Saint Martin de Re (FR)

(*) Notice: Subject to any disclaimer, the term of this patent is extended or adjusted under 35 U.S.C. 154(b) by 570 days.

(21) Appl. No.: 17/013,587

(22) Filed: Sep. 5, 2020

(65) Prior Publication Data

US 2022/0073161 A1 Mar. 10, 2022

(51) Int. Cl.
*B62H 5/18* (2006.01)
*B62L 3/06* (2006.01)
*E05B 71/00* (2006.01)
*B62H 5/00* (2006.01)

(52) U.S. Cl.
CPC .............. *B62H 5/18* (2013.01); *B62H 5/003* (2013.01); *B62L 3/06* (2013.01); *E05B 71/00* (2013.01)

(58) Field of Classification Search
CPC ........... E05B 71/00; B62H 5/003; B62H 5/18; B62L 3/06
See application file for complete search history.

(56) References Cited

U.S. PATENT DOCUMENTS

| 735,113 | A | * | 8/1903 | Kelland et al. | ........... B62L 3/06 188/24.21 |
| 3,855,825 | A | * | 12/1974 | Pickard | ................... E05B 71/00 70/226 |
| 4,068,504 | A | * | 1/1978 | Pickard | .................... E05B 71/00 70/226 |
| 4,269,049 | A | * | 5/1981 | Henderson | .............. E05B 71/00 70/234 |
| 4,708,004 | A | * | 11/1987 | Allen | ........................ B62L 3/06 70/228 |
| 5,265,451 | A |  | 11/1993 | Phifer |  |
| 5,862,688 | A | * | 1/1999 | Odegard | ................. B60R 25/09 70/226 |
| 7,707,861 | B2 | * | 5/2010 | Xavier | ..................... B62H 5/18 70/233 |
| 8,505,694 | B2 | * | 8/2013 | Ginster | ................. B60T 11/046 188/24.12 |
| 2006/0096340 | A1 | * | 5/2006 | Laquieze | ................. B62H 3/04 70/225 |

(Continued)

FOREIGN PATENT DOCUMENTS

DE 207 833 C 3/1909
DE 298 11 255 U1 10/1998
(Continued)

*Primary Examiner* — Christopher J Boswell
(74) *Attorney, Agent, or Firm* — H&I Partners; C. Andrew Im; Jean-Christophe Hamann

(57) ABSTRACT

Anti-theft device of a bicycle wheel includes at least one braking unit having two pads acting on a rim of the wheel and an actuator to control at least one braking unit. The actuator includes two tie-rods pivoting on shafts and is actuated by a key acting on a key cylinder to press the pads on the rim of the wheel. Each tie-rod is driven at one end by a secondary transmitter piston interacting with a primary transmitter piston and driving a receiver piston holding the pad at its other end. The rotational movement of the key cylinder is converted into a translational movement of the primary transmitter piston by an indirect movement converter.

21 Claims, 10 Drawing Sheets

SECTION B-B

(56) References Cited

U.S. PATENT DOCUMENTS

2009/0178446 A1* 7/2009 Patterson ................ E05B 71/00
                                                              70/259
2022/0111925 A1* 4/2022 Tsai ........................ B62H 5/18

FOREIGN PATENT DOCUMENTS

| FR | 370 793 A | 2/1907 |
| FR | 392 385 A | 11/1908 |
| FR | 799 284 A | 6/1936 |
| KR | 2017 0112116 A | 10/2017 |

* cited by examiner

ANTI-THEFT DEVICE FOR BICYCLES BY BRAKING AT LEAST ONE WHEEL

FIELD OF THE INVENTION

The invention relates to an anti-theft device for a cycle.

STATE OF THE ART

Traditionally anti-theft devices of the "boot" type are frames in the shape of a horseshoe fastened to the frame of the bicycle. These "boots" immobilize the rear wheel (in general and preferably) by passing a bar through the spokes of the wheel, it is very simply the principle of the stick in the wheel. Such anti-theft devices are also known under the name "frame-locks".

The major disadvantage is the fact that the thief (or the owner of the bicycle if they are careless or distracted) by wanting to move the bicycle by pedaling or by pushing it on foot, causes a violent impact on at least one spoke. This results in that the impacted spoke is twisted or worse broken or pulled off, which warps the rim, makes it very difficult and even impossible to use, after unlocking said "Boot" anti-theft device.

OBJECT AND SUMMARY OF THE INVENTION

An anti-theft device according to the invention aims to dissuade any thief who wants to use a bicycle on which the anti-theft device is installed by restraining the rotation of a wheel of the bicycle.

According to a first embodiment of the invention, this feature is achieved by the use of at least one braking unit comprising two pads acting on a rim of the wheel; and a device for actuating the at least one braking unit, comprising two tie-rods pivoting on shafts, actuated by a key acting on a cylinder to press the pads on the rim of the wheel.

The pads can be dedicated pads acting on the rim or the tire or the hub; or also be pads of the normal brake system of the bicycle (like drum brakes, disk brakes, V-brakes, etc.).

The device for actuating the braking unit can be active or passive and direct or indirect, like a key cooperating with the cylinder of a lock fastened onto the support of the braking unit or brakes, an electric control coupled to the on/off switch system of an electrically-assisted bicycle (EAB) or even an electromagnetic control controlled by a smartphone.

In order to achieve the locking and anti-theft function by braking, each tie-rod is driven at one end by a secondary transmitter piston interacting with a primary transmitter piston and driving at its other end a receiver piston holding the pad, and the rotation movement of the key cylinder is converted into a translational movement of the primary transmitter piston by an indirect movement conversion unit.

Optionally or in addition, the indirect movement conversion unit comprises:
 a drum provided with tracks having each two cams;
 fingers being integral with the primary transmitter pistons and being in interaction with said cams and which translate said primary transmitter pistons under the action of the drum, springs pushing the secondary transmitter pistons, the springs being located between each of said primary and said secondary pistons; and
 a shaft that passes through the secondary transmitter piston to drive the tie-rod which is provided with elongated holes at each one of its ends.

This way, the rotation movement of the key and the cylinder can be transmitted to the pad holders located away from the cylinder, the latter usually being located above the wheel, whereas the pad holder is located at the rim's level.

Optionally or in addition, three zones are defined on the cams:
 a first zone with a steep slope allowing a fast approach of the pads towards the rim;
 a second zone with a gentler slope to easily make it possible to apply pressure to the springs; and
 a third zone without any slope, which immobilizes the fingers, without the risk of a return of movement of the key.

Optionally or in addition, the pad holder is mounted eccentric on the shaft of the receiver piston, which makes it possible thanks to a screw to modify as needed the height of the pad facing the rim.

Optionally or in addition, the tie-rods have a boss at their lower end which presses on a guillotine which has a return spring, so as to mask the heads of the screws when the anti-theft function is active, the anti-theft device thus cannot be removed.

Optionally or in addition, the anti-theft device comprises a device for fastening the bicycle to a support outside of the cycle.

Optionally or in addition, the device for fastening the bicycle to a support outside of the cycle is an anti-theft cable having its lock integral with the device for actuating, the drum having a housing with a slope which when rotating under the action of the key pushes back a slug put under pressure by a spring, which has for an upper abutment a plug, which blocks the removal of a free end of the cable.

Optionally or in addition, the device for fastening the bicycle to a support outside of the cycle is an anti-theft cable integral with a support plate which has an open or closed profile, which makes it possible to receive said cable in order to store it properly.

According to a second embodiment of the invention, the anti-theft device of a bicycle wheel comprises:
 at least one braking unit comprising two pads acting on a rim of a wheel; and
 a device for actuating the at least one braking unit, comprising a key cylinder that releases a pulley which via transmission cables actuates springs which put receiver pistons carrying the pads under pressure on the rim of the wheel.

This way, the anti-theft function of the device is achieved by releasing the pulley into a braking position.

Optionally or in addition, the pulley is blocked in a braking position by a first retractable finger provided in a drum driven in rotation by the key cylinder, a spring cooperating with an abutment to push the finger partially out of the drum.

Optionally or in addition, a return spring brings back the key cylinder to the neutral position when the key is released, after having brought it back a little to un-notch it.

Optionally or in addition, a lever is integral with the pulley, allowing it to unlock manually the anti-theft device once the key cylinder unblocks the pulley from its braking position.

This way, the springs are put under pressure again, the pads are no longer compressed against the rim, and the pulley can be released on a further moment in order to lock the bicycle.

Optionally or in addition, the lever can be integrally disengaged from the pulley in the event a thief attempts to force said lever, a ball or the like is put under pressure by a spring being housed in the hub of said pulley and cooperating with a hollow arranged in the lever.

This way, the lever is totally disengaged from the pulley and the bicycle cannot be stolen, since the pads are still under compression against the rim.

Optionally or in addition, the anti-theft device comprises an optional device for fastening the bicycle to a support outside of the cycle.

Optionally or in addition, the device for fastening the bicycle to a support outside of the cycle is an anti-theft cable, the anti-theft device comprising a second retractable finger which is used to block an anti-theft cable and being provided on the drum along with a spring cooperating with an abutment to push the second retractable finger partially out of the drum.

Optionally or in addition, a nail-shaped part cooperates with a boss of the pulley and a specific notch of the key, so that the key remains in its corresponding cylinder when the bicycle is in the state for use.

According to a third embodiment of the invention, the anti-theft device of a bicycle wheel comprises:
- at least one braking unit comprising a pad acting on a rim of a rear wheel; and
- a device for actuating the at least one braking unit, comprising a key acting on a cylinder putting a pad hold by a pad holder under pressure on the rim of the wheel by the rotation force acting on said key when the device is in a braking position, via a drum connecting directly said cylinder and said pad holder.

This way, the anti-theft device can be mounted near the brakes, or even onto the same mounting points than the usual brakes. In addition, the system is very compact and comprises very few elements, reducing the complexity of the system.

Optionally or in addition, the anti-theft further comprises:
- a track provided with cams carried by the drum;
- a finger actuated by the track and which transmits its movement to a primary piston, a secondary piston being housed coaxially in this primary piston and receiving said pad at the outside end thereof; and
- a spring being inserted between the primary piston and the secondary piston; so as to allow for the return of the secondary piston, a screw integral with the primary piston slides in the secondary piston when the latter is driven into the primary piston, and the head of this screw abuts against the secondary piston when the latter exits the primary piston.

Optionally or in addition, the braking units in all embodiments are made from a material which has the specificity of emitting a loud and unpleasant noise when it is in contact with the friction zone provided on the wheel and said wheel is set into rotation.

This braking system is therefore indeed an anti-theft device since the voluntary action of the user dissuade the theft or temporary borrowing of one's bicycle, by making the bicycle difficult and/or noisy to move since the wheel (the real wheel more preferably) is braked, even blocked.

In other words, the anti-theft device according to the invention aims to energetically brake the bicycle, in order to dissuade any thief who wants to use it immediately.

For this, the claimed invention comprises:
- at least one brake or braking unit, for example: either a pad acting on the rim or the tire or the hub; or very simply by using the normal brake system of the bicycle (drum, disk, v-brake, etc.).
- an actuator to control the brakes or braking unit that can be active or passive and direct or indirect by the interposition of a means of transmission.

The actuator for controlling the brakes or braking unit can be for example:
- conventionally, a key cooperating with the cylinder of a lock fastened onto the support of the brakes or the braking unit;
- an electric control coupled to the on/off switch system of an electrically-assisted bicycle (EAB);
- an electromagnetic control controlled by a smartphone; and/or
- optionally an anti-theft device fastened to a support outside of the bicycle, such as an anti-theft cable (5).

According to an exemplary embodiment the claimed invention comprises and in the order of the kinematic chain:
- an actuator is a key cooperating with a cylinder integral with a cam mechanism acting on the brakes or the braking unit directly, or indirectly thanks to a connector, the actuator can be active (providing a pressure on the brake pad(s)), or passive (allowing a spring to push the brake pad);
- Optionally a connector between the actuator and the brake pad(s), for example: cable(s), tie-rod(s), pulley(s), rail(s), horn(s), belt(s), chain(s), etc.; and
- brakes or braking unit, such as, for example: at least one brake pad, preferably noisy when it is in friction, the brake pad and its support acting by sliding (like a piston), or by oscillating thanks to an articulated mechanism, such as, a lever arm provided with a pivoting axis.

Optionally and advantageously, the anti-theft device by brake pad(s) according to the claimed invention is coupled to an anti-theft device by cable or folding plate (of the bricklayer's meter type) or U-shaped. The actuator, the key herein, acts at the same time to release the anti-theft brake pad(s) that also form a parking brake, and the anti-theft cable. The brake pad is preferably be made from a material that has the specificity of emitting a loud and unpleasant noise when it is in contact with the friction zone provided on the wheel and when the wheel is set into rotation.

BRIEF DESCRIPTION OF THE DRAWINGS

The accompanying drawings illustrate the claimed invention.

DESCRIPTION OF EMBODIMENTS OF THE INVENTION

Figures 1, 2, 3:
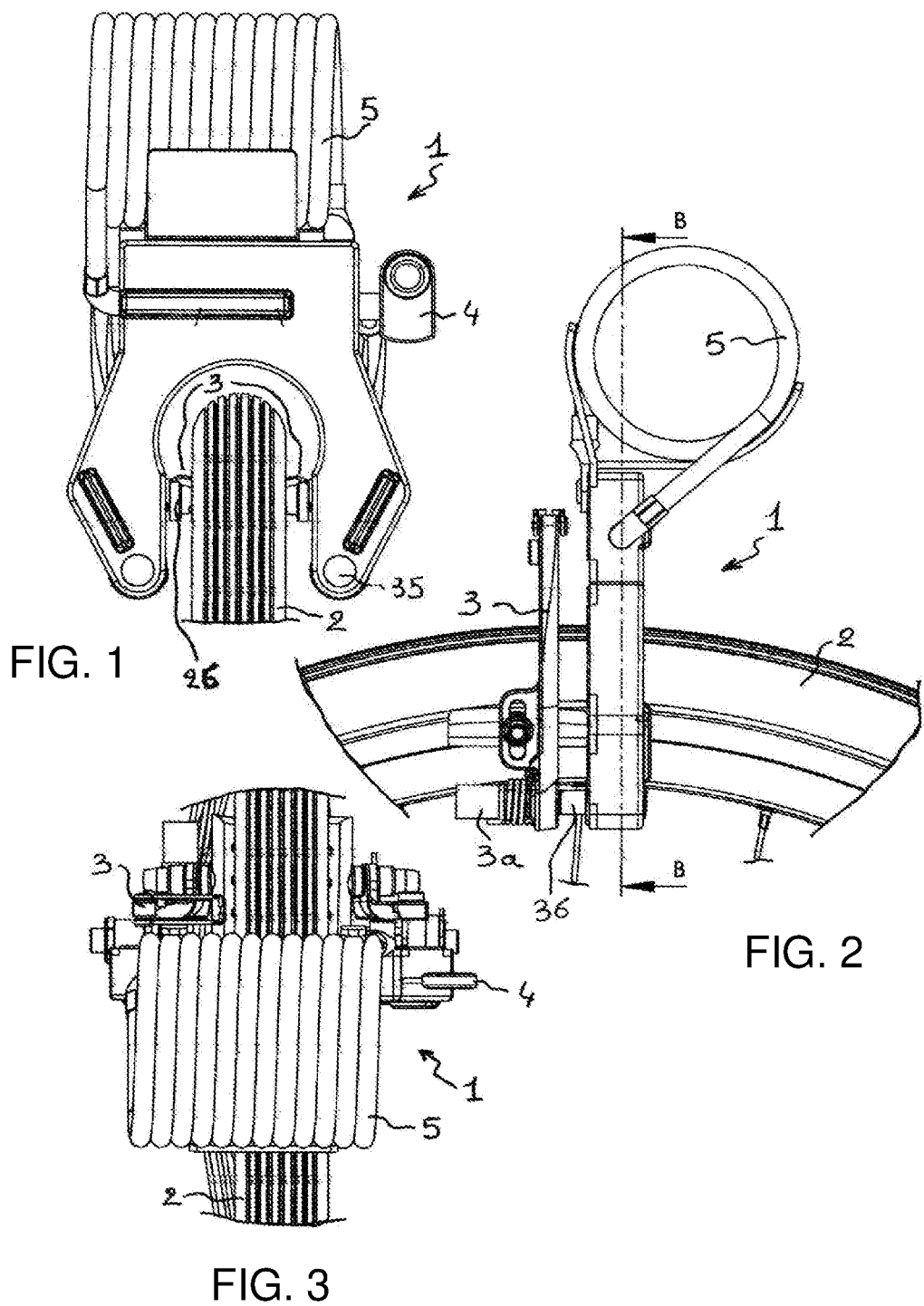
FIG. 1 is a rear view of a bicycle provided with the anti-theft device according to an exemplary embodiment of the invention in its "indirect active" configuration, acting on the rim of the rear wheel.
FIG. 2 is a left side view of FIG. 1.
FIG. 3 is a top view of FIG. 1.
Figure 4:
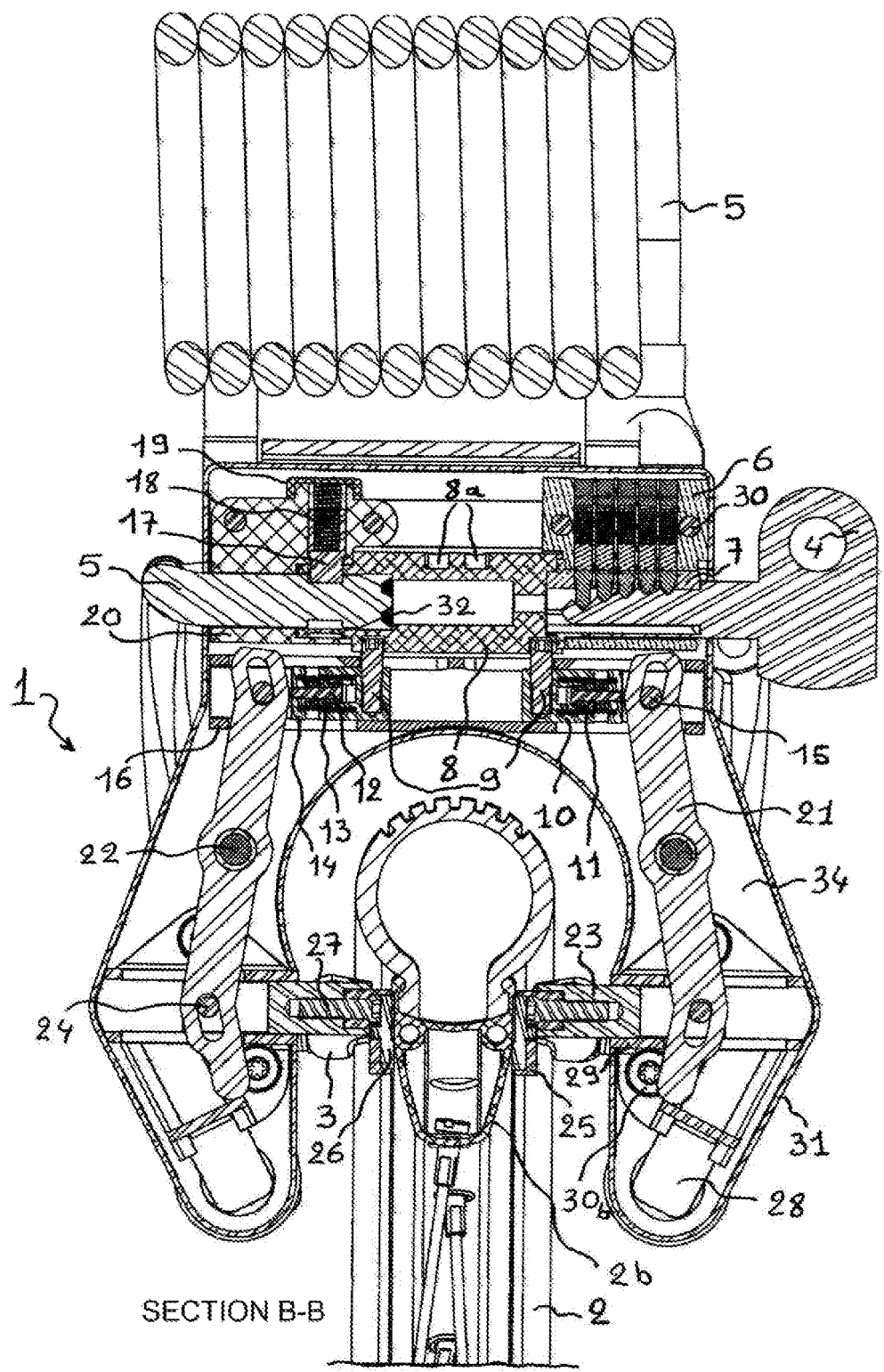
FIG. 4 is a cross-sectional view along B-B of FIG. 2.

In the three embodiments shown, elements that have identical or similar functions will have identical numbers.

In reference to these drawings, according to a first exemplary embodiment of the claimed invention shown in FIGS. 1 to 6, a bicycle provided with a rear wheel (2) and traditional brake of the V-Brake type (3) mounted on cleats (3a), is provided with the anti-theft device by braking (1) according to an exemplary embodiment of the claimed invention.

In the first configuration, the action of the key (4) is active since it is the force of rotation on the key (4) that presses the pads (26) on the rim of the wheel (2), this indirectly through a mechanism of tie-rods (21) pivoting on shafts (22).

The key (4) therefore actuates a cylinder (7) housed in a lock body (6) fastened to the support plate (34) by screws (30). The cylinder (7) drives in rotation a drum (8) provided with tracks (8a) with cams (8b). Under the action of the cams (8b), fingers (9) integral with primary transmitter pistons (10) translate the primary transmitter pistons (10) in the bore of a support (16). On the right and on the left, a spring (11) with an ad hoc length and tension pushes the secondary transmitter pistons (14) in a first step without really compressing. By turning, the key (4) has therefore brought the pad (26) in contact with the rim (2b), by continuing to turn the key (4), the cyclist compresses the springs (11) which ensures a clamping and therefore a braking on the rim (2b).

Thanks to the springs (11), the anti-theft device adapts to different rim sizes and widths, as well as it adapts to a slightly damaged or bent wheel. More precisely, the springs (11) press the pads (26) so as to enter in a firm contact with the rim (2b) and apply pressure evenly on the rim (2b). The springs (11) used in the other embodiments of the claimed invention achieve the same result in a similar way.

Preferably, each track, i.e. the left and the right track (8a), has two cams (8b) which define three zones:
- a first zone with a slope allowing for a fast approach of the pad towards the rim (2b);
- a second zone with a gentler slope to easily make it possible to apply pressure to the springs (11); and
- a third zone without any slope, which immobilizes the fingers (9), without the risk of a return of movement of the key (4).

To guarantee the return of each piston (14), a return screw (12) is screwed coaxially of the piston (14) and is free in translation when the spring is compressed and abuts on a cup (13) integral with the piston (10) when the spring (11) is relaxed.

A shaft (15) passes through the piston (14) to drive the tie-rod (21) provided with holes at each one of its ends.

Under the action of the piston (14), pushed by the piston (10) via the spring (11), the tie-rod (21) pivots on its shaft (22), driving at its other end a receiver piston (23) via a shaft (24).

Each piston (24) is preferably integral with a pad holder (25) mounted eccentric on the shaft of the piston (24), which makes it possible thanks to a screw (27) to modify as needed the height of the pad (26) facing the rim (2b).

Each piston (24) slides in the bore of a monolithic right and left support (29) of the support (34) or fastened to the latter by screws (30a).

For safety, the tie-rods (21) have a boss at their lower end which presses on a guillotine (28) which has a return spring (33), the purpose being to mask the imprint of the screws (30a) when the anti-theft function is active, the anti-theft device thus cannot be removed. Two plugs (35) close off the access holes to the screws (30a); holes that are made in the cover casing (31).

Screws/nuts (36) are provided to act as a connecting interface between the cleats (3a) and the support plate (34).

Advantageously, in accordance with an exemplary embodiment of the claimed invention, the anti-theft device by braking (1), comprises an anti-theft cable (5) of which the locking mechanism is integral with the actuator, the key (4) herein. For this, the drum (8) also comprises a housing with a slope which when rotating under the action of the key (4) pushes back the slug (17). It is the slug (17), put under pressure by a spring (18), and which has for an upper abutment a plug (19), that blocks the removal of the end of the anti-theft cable (5). A spring (32) enables the ejection of the cone, the free end of the anti-theft cable (5).

Figure 5:
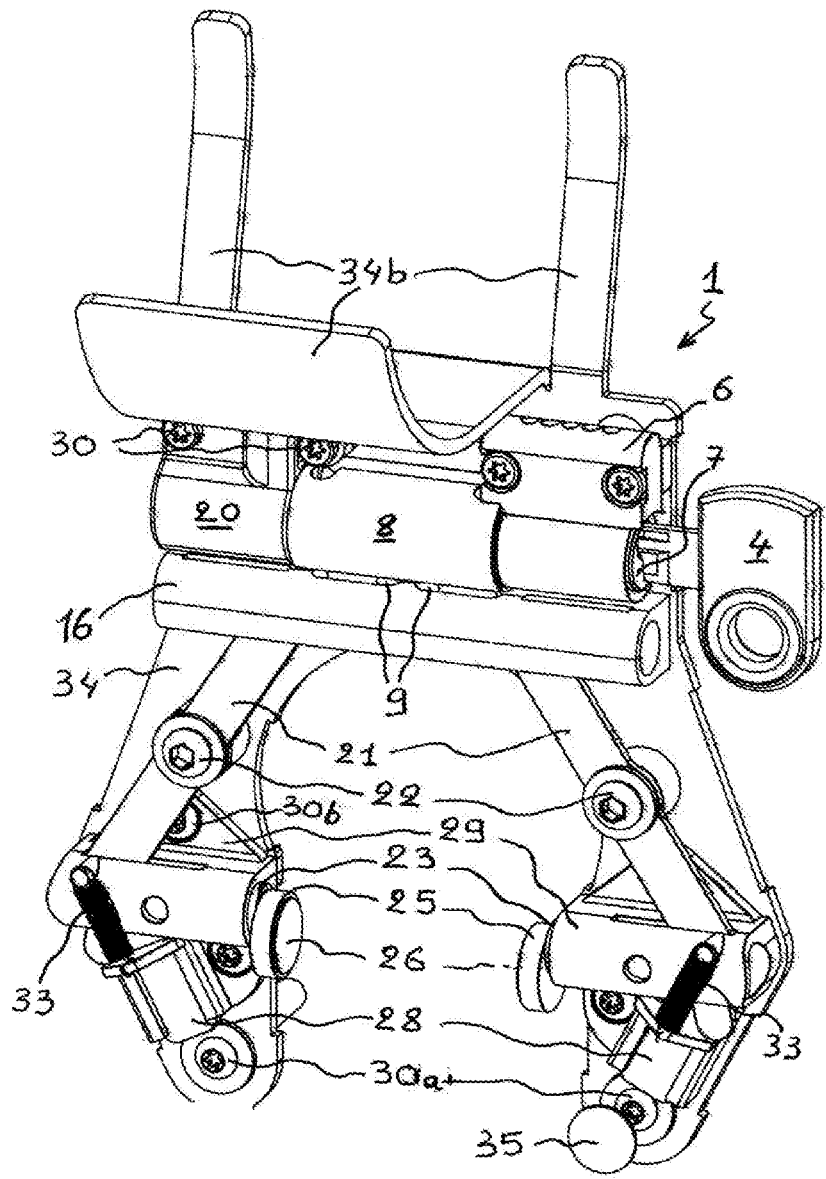
FIG. 5 is a right rear ¾ view, with the anti-theft device devoid of its protective cover, and with the brakes (pads) retracted.
Figure 6:
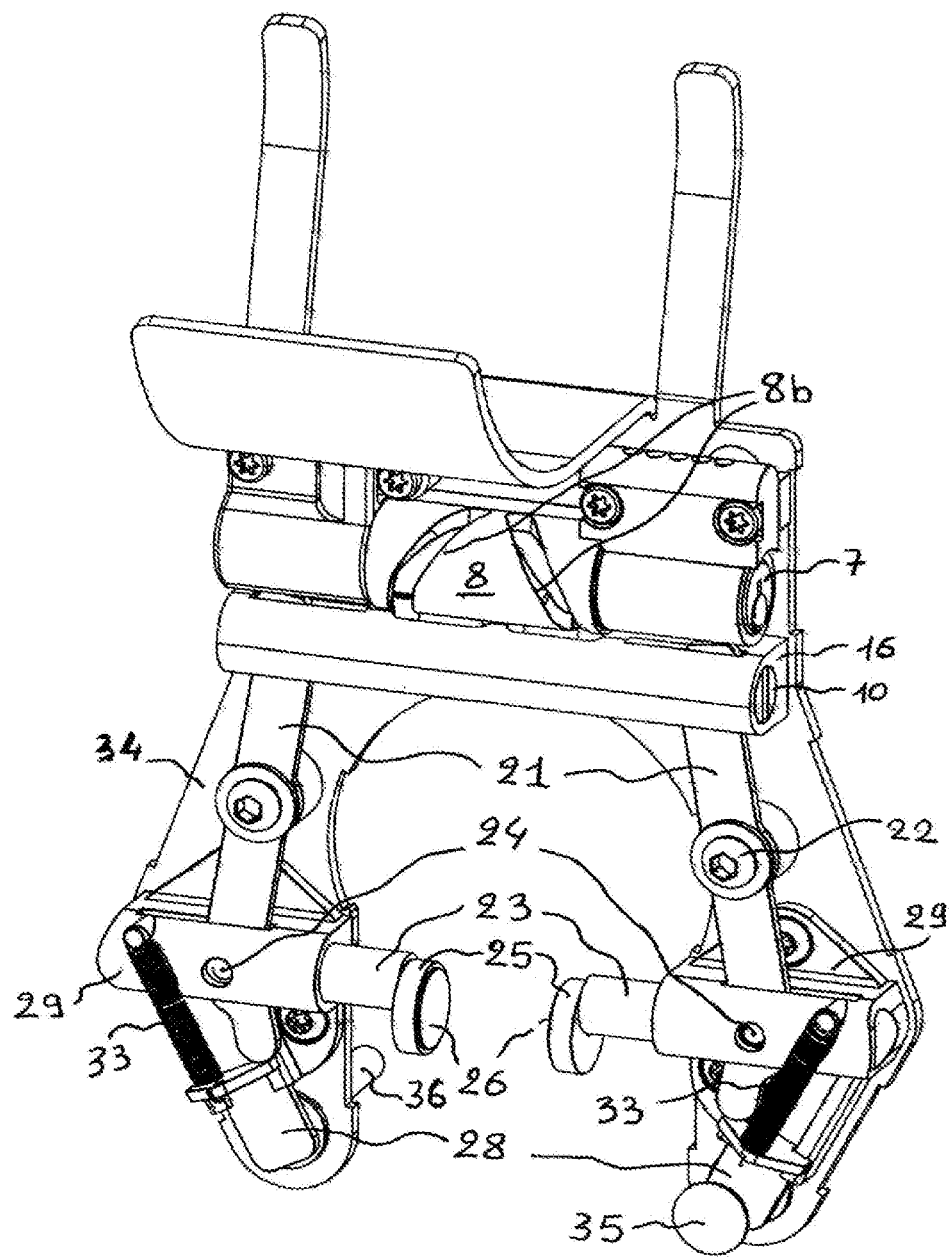
FIG. 6 is a view similar to FIG. 5 but with the brakes actuated, therefore extended to pinch the rim.
Figures 7, 8:
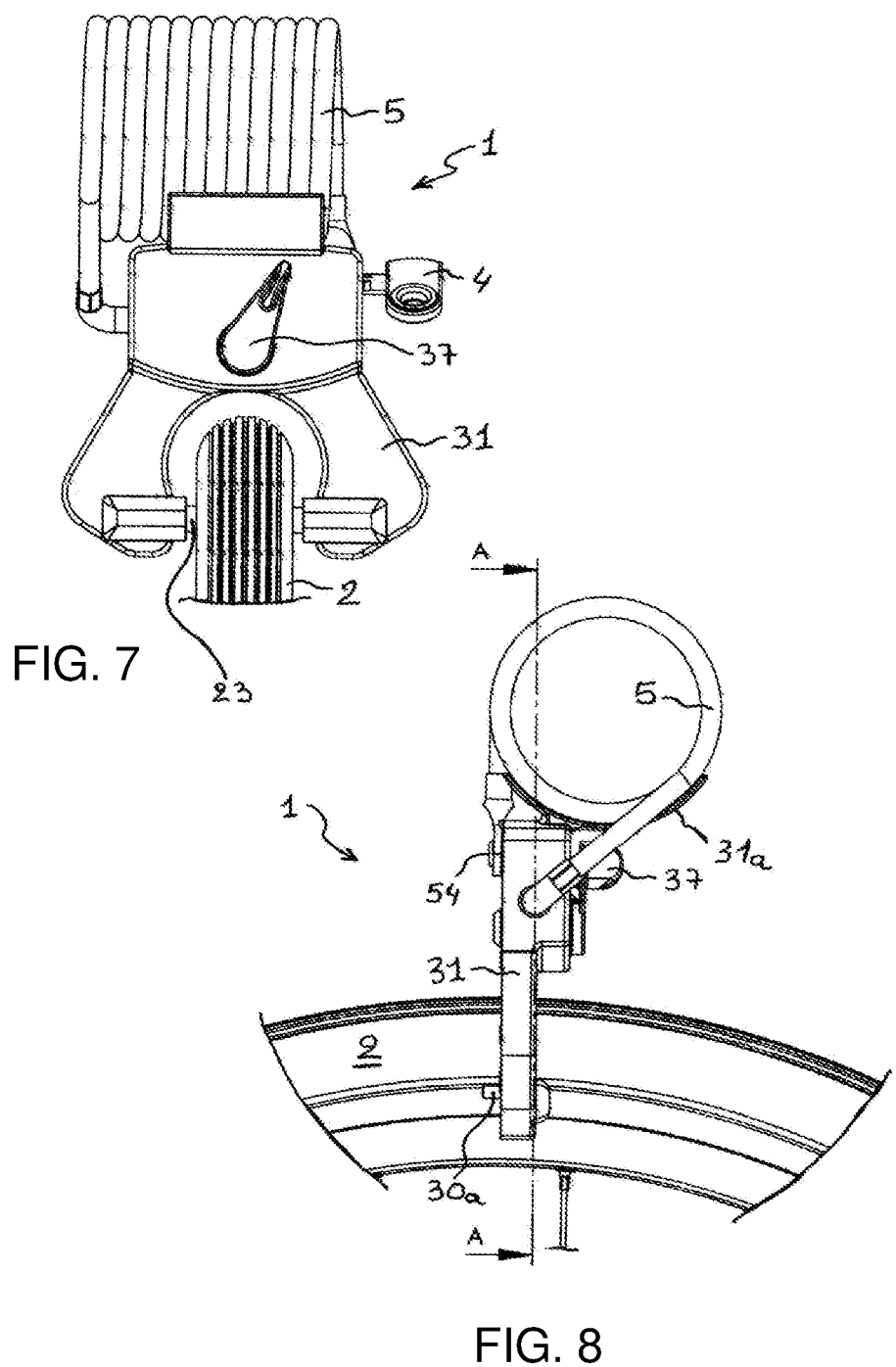
FIG. 7 is a rear view of a bicycle provided with the anti-theft device according to an exemplary embodiment of the claimed invention in its "indirect passive" configuration, acting on the rim of the rear wheel.
FIG. 8 is a left side view of FIG. 7.
Figure 9:
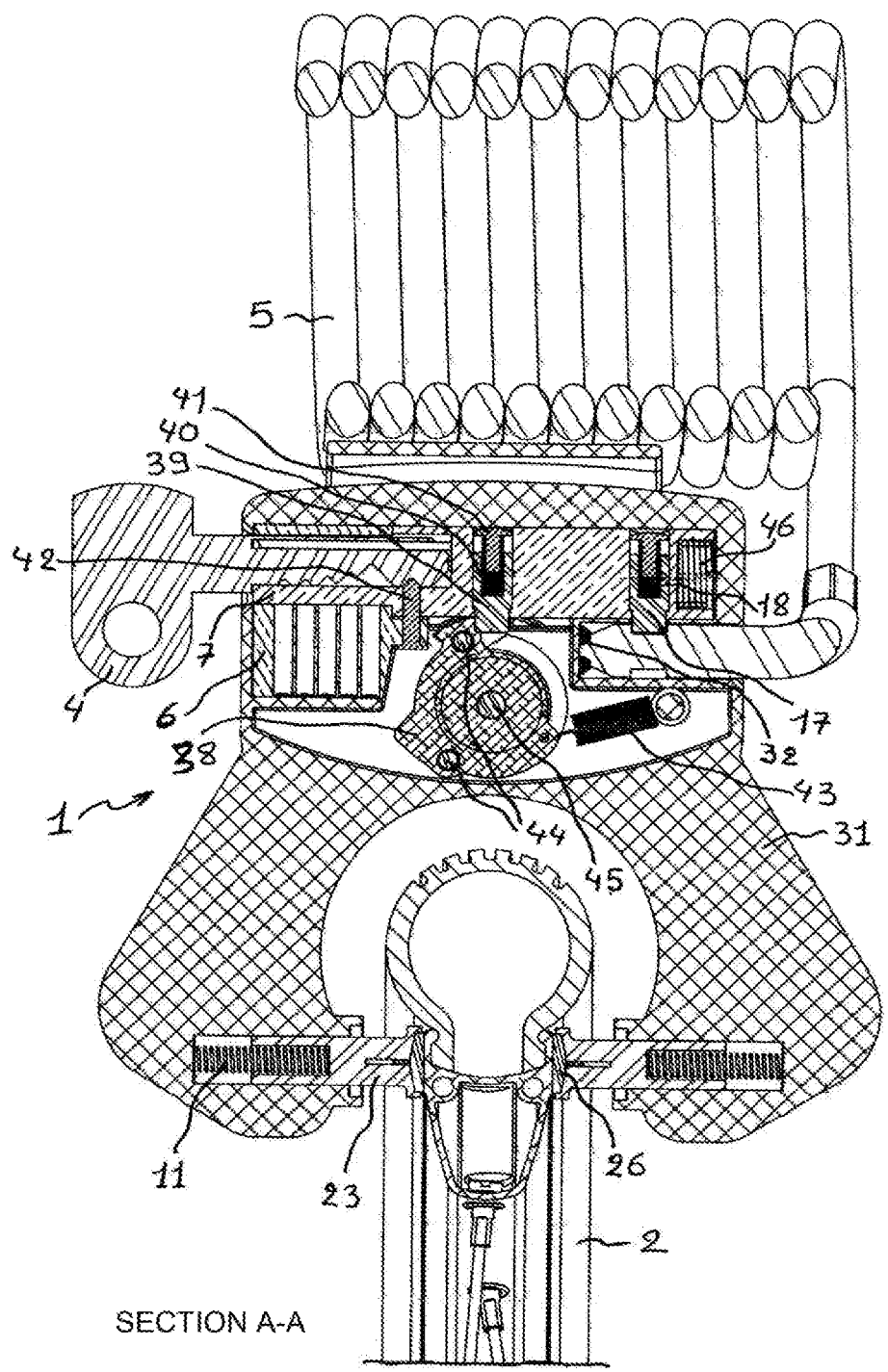
FIG. 9 is a cross-sectional view along A-A of FIG. 8.
Figure 10:
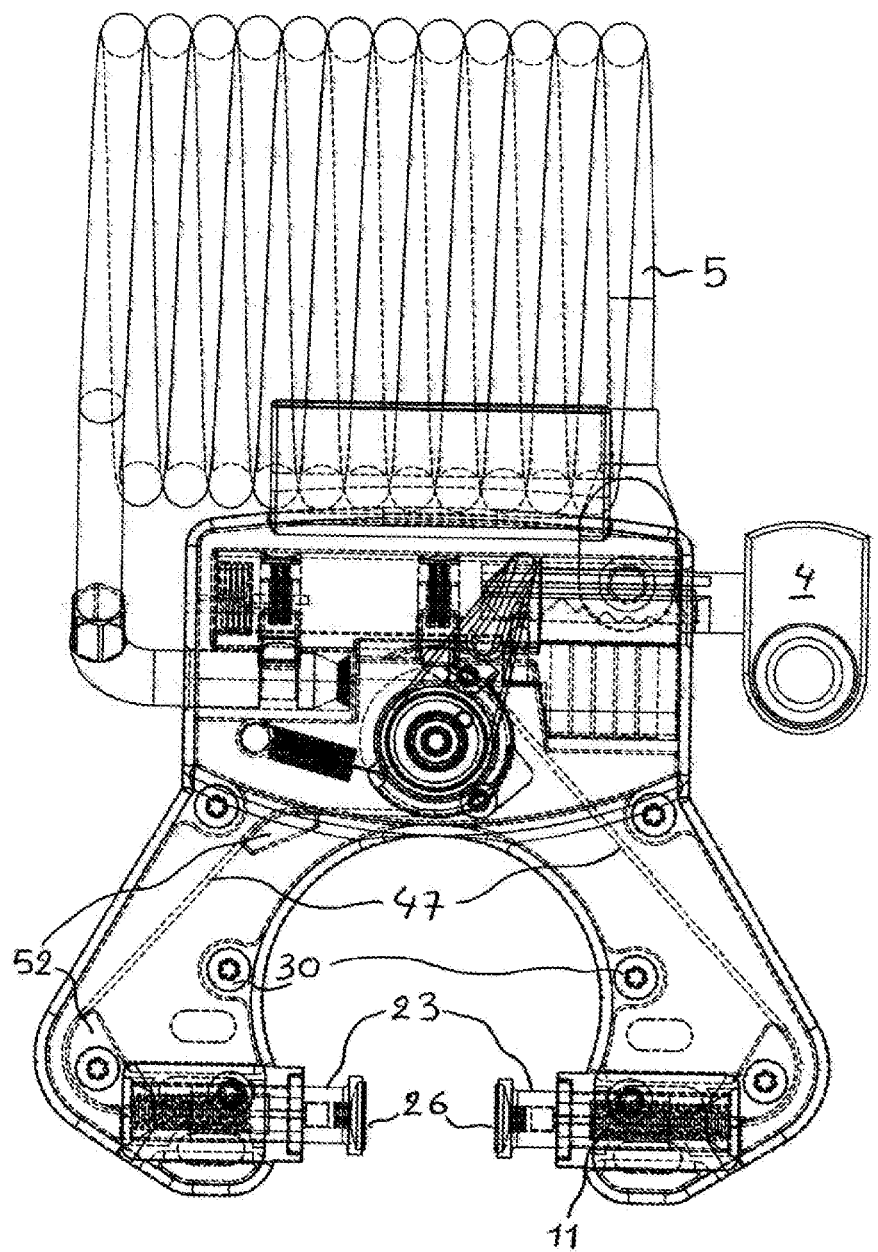
FIG. 10 is an enlarged view of FIG. 7 showing the anti-theft device alone, with the hidden lines as dotted lines.
Figure 11:
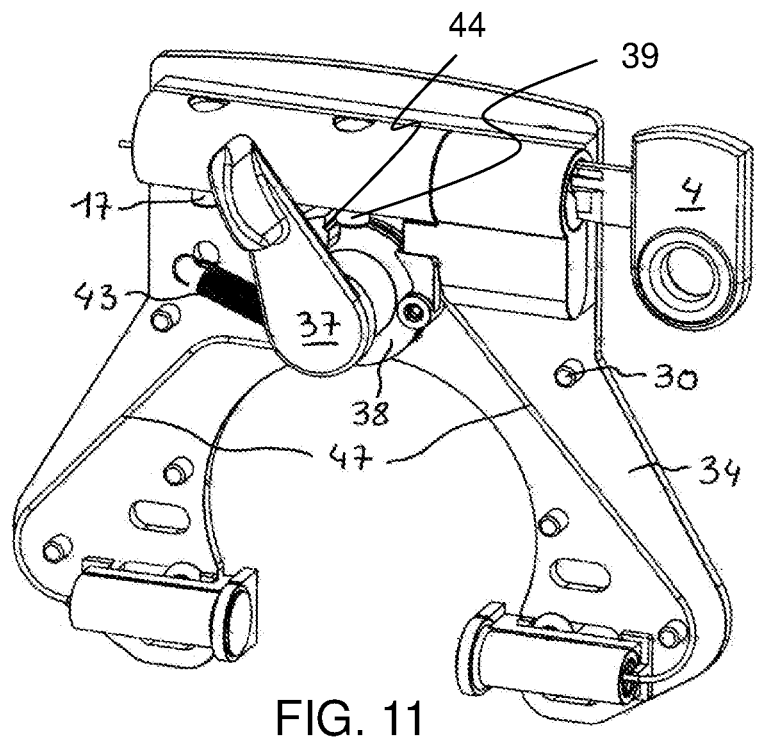
FIG. 11 is a right rear ¾ view of the anti-theft device, in accordance with an exemplary embodiment of the claimed invention, devoid of its cover support, and with its means of braking (pads) retracted.
Figure 12:
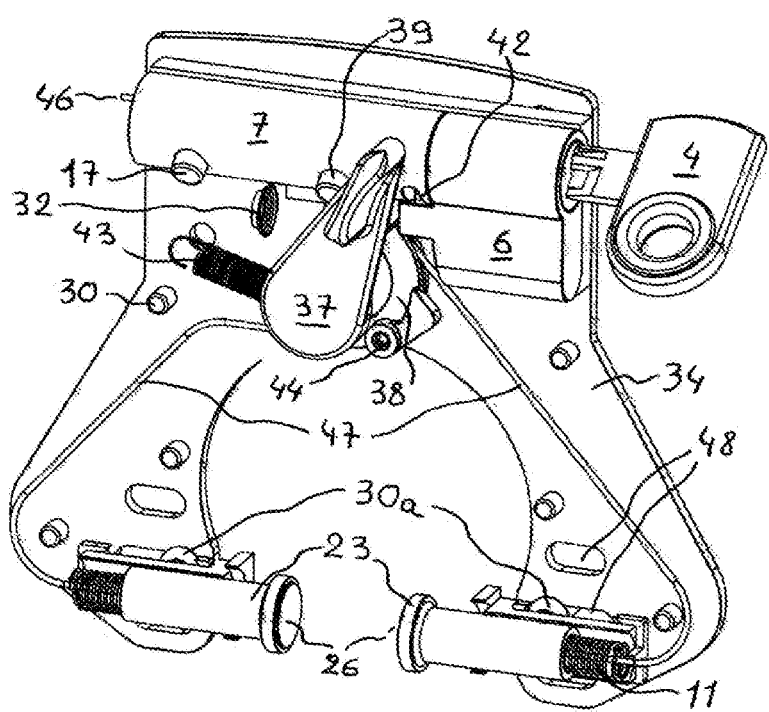
FIG. 12 is a view similar to FIG. 11 but with the key turned, which actuates the brakes, which are therefore extended in order to pinch the rim.

Still advantageously, in accordance with an exemplary embodiment of the claimed invention, the support plate (34) comprises an open or closed profile by folding or unfolding (34b), as exemplary shown in FIGS. 5 and 6, which makes it possible to receive the anti-theft cable (5) in order to store it properly.

According to a second exemplary embodiment of the claimed invention, shown in FIGS. 7-14, the action of the key (4) is passive and indirect since the rotation of the key (4) releases a pulley (38) which via the transmission cables (47) to activate the springs (11), thereby putting the pads (26) under pressure on the rim (2b) of the wheel (2).

As with the first exemplary embodiment, the key (4) actuates a cylinder (7) housed in a lock body (6) fastened by nesting in the cover (31) which hereto serves as a support.

The cylinder (7) monolithically or in added fashion drives in rotation, a drum provided with a bore that receives a first retractable finger (39) used to block the pulley (38), and preferably, a second retractable finger (17) also is used to block any anti-theft cable (5).

The first retractable finger (39) is put under pressure by a spring (40) that cooperates with an abutment (41), and similarly for the second retractable finger (17).

A return spring (46) brings back the cylinder (7) to the neutral position when the key (4) is released after having brought it back a little to un-notch it.

In the second configuration, the action of activating the anti-theft device by braking (1) according to the claimed invention is carried out by simply turning the key (4). The deactivation of the anti-theft device is obtained by turning a lever (37) integral with a pulley (38) which has a screw (45)

for an axis of rotation. The cable clamps (44) of the transmission cables (47) are anchored to the pulley (38) and the other end of the transmission cables (47) carries a head which pulls on a piston (23) carrying the brake pad (26). The transmission cables (47) are guided by gutters (52).

In accordance with an exemplary embodiment of the claimed invention, in order to make possible all of the actions of activating and deactivating the anti-theft device (1) with a single hand, the pulley (38) is provided with a cam (38a). The cam (38a) also acts as a notch to maintain the key (4), and particularly shown in FIGS. 13 and 14.

Figure 13:
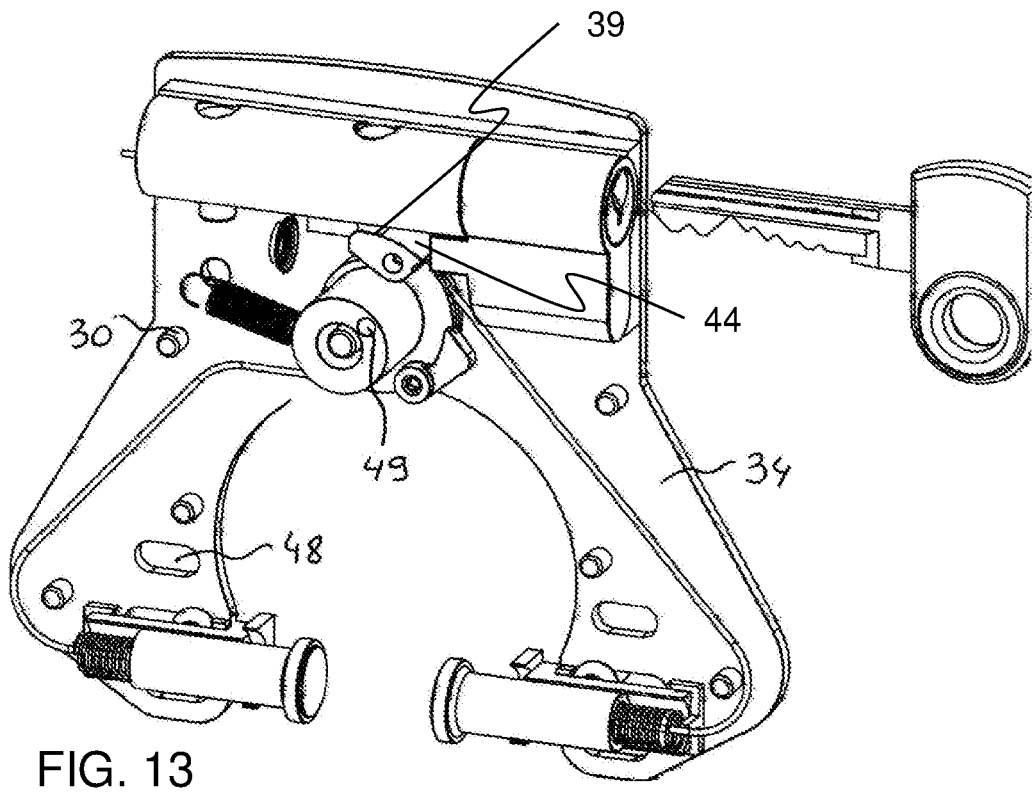
FIG. 13 is a view similar to FIG. 12 but with the key removed from its lock, the unlocking lever being removed in order to improve visibility.
Figure 14:
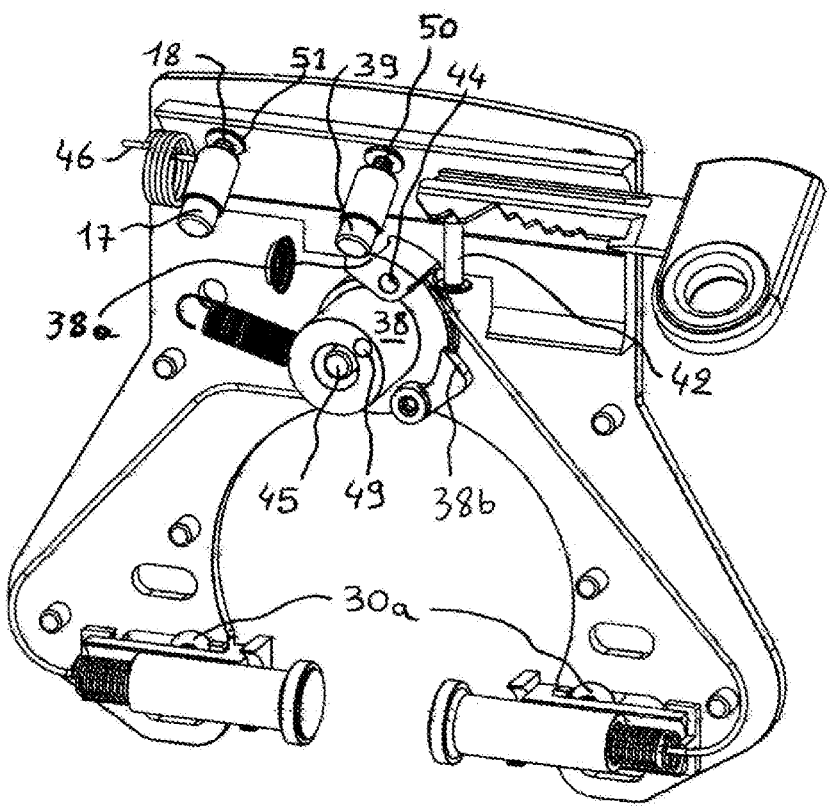
FIG. 14 is a view similar to FIG. 12 but with the lock (body and cylinder) removed in order to improve visibility.

The kinematics of the anti-theft device (1) according to the claimed invention is provided herein:

a) turn the key (4) to release the pulley (38) which enables the brake pad (26) to brake the wheel (2), in this direction of rotation of the key (4), the finger (39) rises without substantial force on the ramp of the cam (38a);

b) manually bring the key back, so as to allow the finger (39) which is under the pressure of the spring (50) to retract slightly so as to pass the notch of the cam (38a), then release the key (4) so that it returns to neutral position on its rotation abutment under the action of the spring (46), the finger (39) now prevents any return action of the pistons (23) by the lever (37);

c) once in neutral, the key (4) can be removed, see FIG. 13, the anti-theft device is then perfectly active, the brake pads clamping the rim of the wheel (2) to dissuade movement of the bicycle, all the more so that the material used to make the brake pads (26) generates a very unpleasant noise if the wheel (2) despite everything accepts to rotate under the pushing of the thief on the bicycle;

d) to remove the anti-theft device (1), the owner of the bicycle inserts the key (4) in the cylinder (7), turns the key until the finger (39) passes to the outside of the pulley (38), similar to the sequence set forth in subparagraph a), the key (4) is then maintained in this position, which allows the user to let go of the key; and e) with the same hand (or optionally the other hand) as the one that turned the key, the cyclist/owner can then actuate the lever (37), wherein the turning drives the pulley (38) which pulls on the cables (47) to cause the removal of the pistons (23) and therefore the pads (26), thereby releasing the bicycle from any action of anti-theft braking; and at the same time, while turning, the pulley (38) allows the key (4) to return to the neutral position under the action of the return spring (46).

Preferably, in accordance with exemplary embodiment of the claimed invention, the pulley has a return spring (43) in addition to the springs (11) of the pistons (23).

To ensure safety, in accordance with an exemplary embodiment, the claimed invention provides the lever (37) that can be integrally disengaged from the pulley (38) in the event a thief attempts to force the lever (37). To accomplish this, in accordance with an exemplary embodiment of the claimed invention, a ball or a part (49) put under pressure by a spring (not shown), is housed in the hub of said pulley (38) and cooperates in an ad hoc manner with a hollow arranged in the lever (37). By forcing the lever (37), the thief renders the lever (37) idle, which protects the mechanism of the anti-theft device (1) from any malfunction. By releasing the lever (37) on the pulley (38), the user/owner can then deactivate the anti-theft device (1) by turning the key (4).

In this configuration, the fastening plate (34) is provided with holes (48) allowing for a fastening on the same fastening points as traditional boot anti-theft devices.

Advantageously, in accordance with an exemplary embodiment of the claimed invention, the anti-theft device by braking (1) comprises an anti-theft cable (5) of which the locking device is integral with the actuator, the key (4) herein. The cylinder (7) has an additional finger (17) put under pressure by a spring (18), which has an upper abutment (51). It is this finger (17) that blocks the removal of the end of the cable (5). To put the anti-theft cable (5) back into its housing, it is sufficient to push on the cable (5). The tapered end of the cable (5) easily pushes back the finger (17) which then retracts into the groove of the cable (5).

A spring (32) pushes back the end of the anti-theft cable (5) when the key (4) is turned to actuate the anti-theft device (1), which allows the end of the cable (5) to be extracted with a single hand. The other end being preferably fastened by a rivet (54) on the plate (34).

Still advantageously, in accordance with an exemplary embodiment of the claimed invention, the support cover (31) comprises an open or closed profile by folding or by unfolding (31a) which makes it possible to receive the cable (5) in order to store it properly. Preferably, the support cover (31) is made of resistant plastic, it is snap-fit and optionally screwed on the plate (34), which prohibits access to the fastening screw (30a).

Preferably, the key (4) remains in the cylinder (7) when the bicycle is in the state for use. To accomplish this, a nail (42) cooperates with an ad hoc boss (38b) of the pulley (38) and a specific notch of the key (4).

Figure 15:
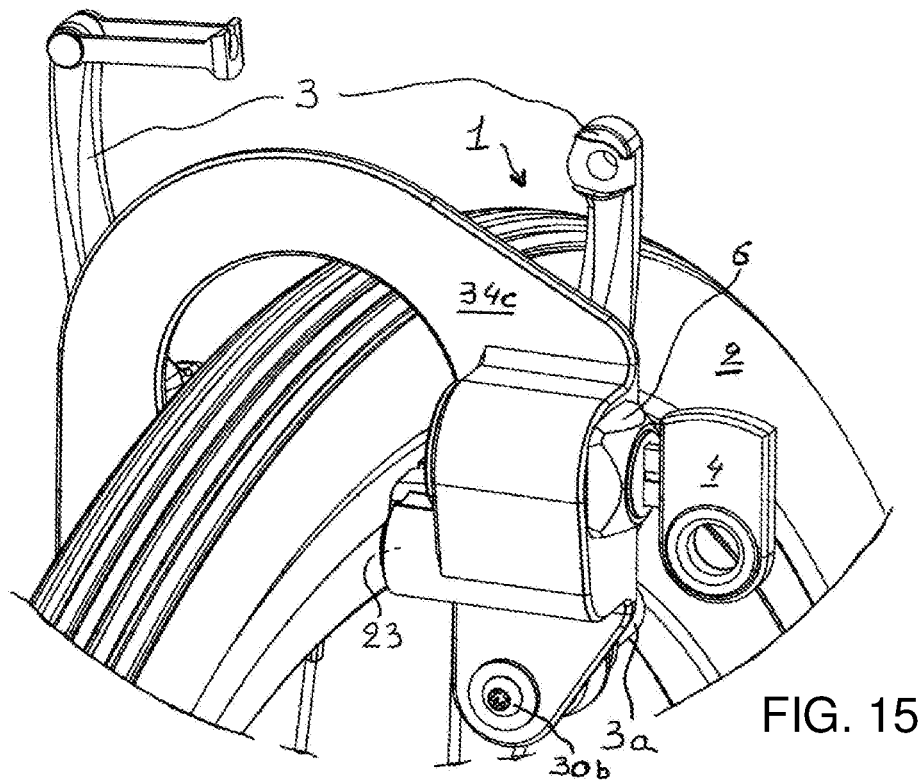
FIG. 15 is a right rear ¾ view, of a bicycle provided with the anti-theft device according to exemplary embodiment of the claimed invention in its "direct active" configuration, acting on the rim of the rear wheel.
Figure 16:
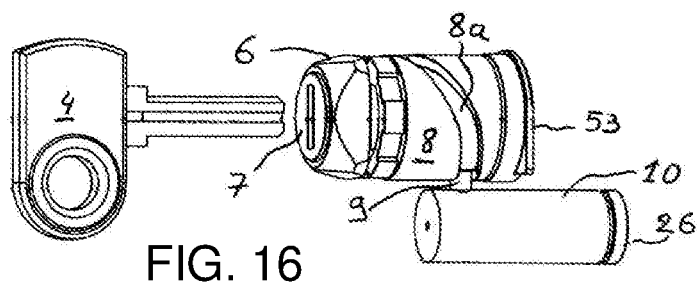
FIG. 16 is a view of the anti-theft mechanism of the anti-theft device of FIG. 15.
Figure 17:
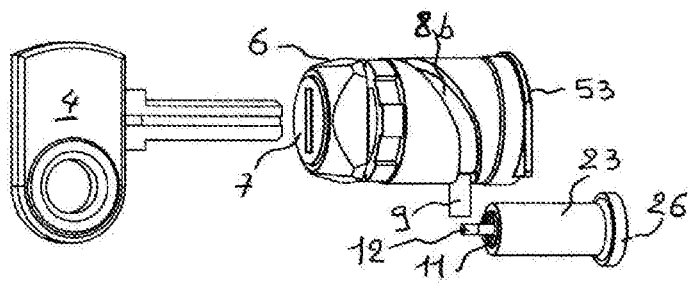
FIG. 17 is a view similar to FIG. 16, with the receiver piston removed to improve visibility.

According to a third exemplary embodiment of claimed invention, shown in FIGS. 15-17, the action of the key (4) is active and direct since it is the rotation force on the key (4) that puts the pad (26) under pressure on the rim (2b) of the means of braking (26).

In this configuration, only one brake pad (26) is sufficient to brake the wheel (2), all the more so that the material chosen for the pad (26) is particularly noisy and therefore dissuasive to force in order to move the bicycle.

In this third exemplary embodiment, the claimed invention comprises:

a lock body (6), integral with a support (34c) in the form of a channel; the support (34c) being fastened on the brake cleats (3a) by screws (30b) with anti-theft head or imprint, screws/nuts (36) may be necessary or preferable;

a monolithic cylinder (7) integral or added with a drum (8) carrying a track (8a) provided with cams (8b) similar to the first exemplary embodiment described herein;

a finger (9) actuated by the track (8a) and which transmits its movement to a primary piston (10); coaxially, in this primary piston (10), a secondary piston (23) is housed that receives the pad (26) at the outside end thereof; in order to ensure a pressure of the pad (26) on the wheel (2), a spring (11) is inserted between the primary piston (10) and the secondary piston (23); and in order to allow for the return of the secondary piston (23), a screw (12) integral with the primary piston (10) slides in the secondary piston (23) when the latter is driven into the primary piston (10), and the head of the screw (12) abuts against the secondary piston (23) when the latter exits the primary piston (10); and a plug (53) obstructs any means of fastening of the drum (8) carrying the track (8a) with the cylinder (7).

The more or less deep screwing of the screw (12) in the primary piston (10) makes it possible to adjust the play with the wheel (2) and/or the desired pressure on the rim (2b) of the wheel (2).

The third exemplary embodiment is particularly economical to carry out and can optionally be devoid of an anti-theft cable (5). If needed, the support (34c) can receive the anti-theft cable (5) as in the two preceding exemplary embodiments.

The anti-theft device according to the claimed invention is particularly intended for bicycles and cycles in general, its action intends to brake and optionally render the movement of the bicycle noisy.

Thus, by retaining the advantages of the traditional boot anti-theft device, the anti-theft device according to the claimed invention does not risk deteriorating the spokes and therefore the wheel.

The invention claimed is:

1. Anti-theft device of a bicycle wheel, comprising:
    at least one braking unit comprising two pads acting on a rim of the bicycle wheel;
    an actuator to control said at least one braking unit, the actuator comprising two tie-rods pivoting on shafts, actuated by a key acting on a key cylinder to press the two pads on the rim of the bicycle wheel;
    wherein each tie-rod is driven at a first end by a secondary transmitter piston interacting with a primary transmitter piston and each tie-rod driving, at a second end, a receiver piston holding a respective pad; and
    wherein a rotational movement of the key cylinder is converted into a translational movement of the primary transmitter piston by a movement converter.

2. The anti-theft device of claim 1, wherein the movement converter comprises:
    a drum provided with tracks, each track comprising two cams;
    fingers being integral with the primary transmitter pistons and being in interaction with the two cams and fingers translate the primary transmitter pistons under the action of the drum, springs pushing the secondary transmitter pistons, the springs being located between each of the primary and secondary pistons; and
    a shaft that passes through the secondary transmitter piston to drive a respective tie-rod which is provided with elongated holes at each end of the shaft.

3. The anti-theft device of claim 2, wherein three zones are defined on the two cams:
    a first zone with a first slope allowing a fast approach of the two pads towards the rim;
    a second zone with a second slope less steep than the first slope to readily apply pressure to the springs; and
    a third zone without any slope, to immobilizes the fingers, without the risk of a return of a key movement.

4. The anti-theft device of claim 1, further comprising a pad holder mounted eccentrically on a shaft of the receiver piston and a screw to modify a height of the two pads facing the rim.

5. The anti-theft device of claim 1, wherein the tie-rods have a boss at their lower end, which presses on a guillotine comprising a return spring, to mask heads of screws when an anti-theft function is activated, thereby prohibiting the removal of the anti-theft device.

6. The anti-theft device of claim 1, further comprising a fastener to secure the bicycle to a support outside of the bicycle.

7. The anti-theft device of claim 6, wherein the fastener is an anti-theft cable having its lock integral with the actuator; and further comprising a drum having a housing with a slope, when rotated under an action of the key, the drum pushes back a slug, under pressure by a spring, the slug having a plug for an upper abutment, to block the removal of a free end of the anti-theft cable.

8. The anti-theft device of claim 6, wherein the fastener is an anti-theft cable integral with a support plate which has an open or closed profile, the support plate being configured to receive and store the anti-theft cable.

9. The anti-theft device of claim 1 wherein said at least one braking unit is made from a material which has a specificity of emitting a loud and unpleasant noise when said at least one braking unit is in contact with a friction zone provided on the bicycle wheel and when the bicycle wheel is set into rotation.

10. Anti-theft device of a bicycle wheel, comprising:
    at least one braking unit comprising two pads acting on a rim of a wheel; and
    an actuator to control at least one braking unit, the actuator comprising a key cylinder that releases a pulley to actuate springs, via transmission cables, to put receiver pistons carrying the pads under pressure on the rim of the bicycle wheel.

11. The anti-theft device of claim 10, wherein the pulley is blocked in a braking position by a first retractable finger provided in a drum rotatably driven by the key cylinder, a second spring cooperating with an abutment to push the first retractable fingers partially out of the drum.

12. The anti-theft device of claim 10, further comprising a return spring to bring back the key cylinder to a neutral position when a key is released from the key cylinder, after having brought the key cylinder back to un-notch the key cylinder.

13. The anti-theft device of claim 10, further comprising a lever integral with the pulley, to manually unlock the anti-theft device once the key cylinder unblocks the pulley from a braking position.

14. The anti-theft device of claim 13, wherein the lever is configured to be integrally disengaged from the pulley when a thief attempts to force the lever, such that a ball is placed under pressure by a spring housed in a hub of the pulley and cooperates with a hollow arranged in the lever.

15. The anti-theft device according to claim 10, further comprising a fastener to secure a bicycle to a support outside of the bicycle.

16. The anti-theft device of claim 15, wherein the fastener is an anti-theft cable; and further comprising a second retractable finger configured to block the anti-theft cable and provided on a drum with a spring cooperating with an abutment to push the second retractable finger partially out of the drum.

17. The anti-theft device of claim 10, further comprising a nail-shaped part configured to cooperate with a boss of the pulley and a predetermined notch of a key, so that the key remains in the key cylinder when a bicycle is in an use state.

18. The anti-theft device of claim 10, wherein said at least on braking unit is made from a material which has a specificity of emitting a loud and unpleasant noise when said at least one braking unit is in contact with a friction zone provided on the bicycle wheel and when the bicycle wheel is set into rotation.

19. Anti-theft device of a bicycle wheel, comprising:
    at least one braking unit comprising a pad acting on a rim of a rear wheel of a bicycle; and
    an actuator to control said at least one braking unit, the actuator comprising a key acting on a key cylinder putting the pad hold, by a pad holder under pressure, on the rim of the rear wheel by a rotational force acting on the key when the anti-theft device is in a braking position, via a drum directly connecting the key cylinder and the pad holder.

20. The anti-theft device of claim 19, further comprising:
a track provided with cams carried by the drum;
a finger actuated by the track and the finger configured to transmit its movement to a primary piston;
a secondary piston being housed coaxially in the primary piston and configured to receive the pad at an outside end thereof; and
a spring inserted between the primary piston and the secondary piston, to enable the secondary piston to return, a screw integral with the primary piston slides in the secondary piston when the secondary piston is driven into the primary piston, and the head of the screw abuts against the secondary piston when the secondary piston exits the primary piston.

21. The anti-theft device according to claim 19, wherein said at least on braking unit is made from a material which has a specificity of emitting a loud and unpleasant noise when said at least one braking unit is in contact with a friction zone provided on the bicycle wheel and when the bicycle wheel is set into rotation.

* * * * *